US010310929B2

(12) United States Patent
Bovey et al.

(10) Patent No.: US 10,310,929 B2
(45) Date of Patent: Jun. 4, 2019

(54) DIAGNOSING COMBINATIONS OF FAILURES IN A SYSTEM

(71) Applicant: BAE SYSTEMS plc, London (GB)

(72) Inventors: Richard Lee Bovey, Bristol-South Gloucestershire (GB); Erdem Turker Senalp, Bristol-South Gloucestershire (GB)

(73) Assignee: BAE SYSTEMS plc, London (GB)

( * ) Notice: Subject to any disclaimer, the term of this patent is extended or adjusted under 35 U.S.C. 154(b) by 792 days.

(21) Appl. No.: 14/784,805

(22) PCT Filed: Apr. 22, 2014

(86) PCT No.: PCT/GB2014/051236
§ 371 (c)(1),
(2) Date: Oct. 15, 2015

(87) PCT Pub. No.: WO2014/170695
PCT Pub. Date: Oct. 23, 2014

(65) Prior Publication Data
US 2016/0085608 A1 Mar. 24, 2016

(30) Foreign Application Priority Data

Apr. 19, 2013 (EP) ..................................... 13275093
Apr. 19, 2013 (GB) ..................................... 1307099.0

(51) Int. Cl.
*G06F 11/07* (2006.01)
*G05B 23/02* (2006.01)
(52) U.S. Cl.
CPC ........ *G06F 11/079* (2013.01); *G05B 23/0278* (2013.01); *G06F 11/0751* (2013.01); *G06F 11/0787* (2013.01)
(58) Field of Classification Search
None
See application file for complete search history.

(56) References Cited

U.S. PATENT DOCUMENTS

2007/0028219 A1   2/2007  Miller et al.
2011/0208680 A1*  8/2011  Bovey ................... G06N 7/005
                                                    706/12

FOREIGN PATENT DOCUMENTS

WO    2009097435 A1    8/2009
WO    2009136183 A2    11/2009
WO    2014170695 A1    10/2014

OTHER PUBLICATIONS

Lerner, Uri et al.; Bayesian Fault Detection and Diagnosis in Dynamic Systems; AAAI-00 Proceedings; 7 pages. (Year: 2000).*
Singh, Satnam et al.; Dynamic Multiple Fault Diagnosis: Mathematical Formulations and Solution Techniques; IEEE Transactions on Systems, Man, and Cybernetics—Part A:Systems and Humans, vol. 39, No. 1, Jan. 2009; pp. 160-176. (Year: 2009).*

(Continued)

*Primary Examiner* — Stanley K. Hill
(74) *Attorney, Agent, or Firm* — Finch & Maloney PLLC (57) ABSTRACT

A system/method of diagnosing combinations of failures in a system includes receiving symptom data (116) including information relating to observed or detected symptoms in a system. The system/method generates (D4*a*, D4*b*, D5) failure data (118) including information relating to at least one most probable failures in the system based on the symptom data, and processes (D9) the failure data and the symptom data using an L-best inference (e.g. a Ranked Algorithm (RA)) technique in order to generate failure set data (120), the failure set data including information relating to at least one most probable combination of the failures that explain the symptoms.

18 Claims, 4 Drawing Sheets

(56) References Cited

OTHER PUBLICATIONS

Pattipati, Dr. Krishna R. et al.; Multiple Fault Isolation in Redundant Systems; NASA Final Report; 1997; 124 pages. (Year: 1997).* de Kleer, Johan et al.; Diagnosing Multiple Faults; 1987 Elsevier Science Publishers B.V.; Artificial Intelligence; pp. 97-130. (Year: 1987).*

Yu, Feili et al.; Multiple Disease (Fault) Diagnosis with Applications to the QMR-DT Problem; 2003 IEEE; pp. 1187-1192. (Year: 2003).*

Kandula, Srikanth et al.; Shrink: A Tool for Failure Diagnosis in IP Networks; 2005 ACM; SIGCOMM'05 Workshops; pp. 173-178. (Year: 2005).*

Tu, et al., "Computationally Efficient Algorithms for Multiple Fault Diagnosis in Large Graph-based Systems," IEEE Transactions on Systems, Man and Cybernetics—Part A: Systems and Humans, vol. 33, No. 1, Jan. 2003. pp. 73-85.

Yu, et al., "A Lagrangian Relaxation Algorithm for Finding the Map Configuration in QMR-DT," IEEE Transactions on Systems, Man and Cybernetics—Part A: Systems and Humans, vol. 37, No. 5, Sep. 2007. pp. 746-757.

International Search Report and Written Opinion received for Patent Application No. PCT/GB2014/051236, dated Jun. 5, 2014. 10 pages.

GB Intellectual Property Office Search Report under Section 17(5) received for GB Patent Application No. 1307099.0 dated Oct. 21, 2013. 3 pages.

EP Intellectual Property Office Extended Search Report received for EP Patent Application No. 13275093.6 dated Apr. 28, 2014. 6 pages.

Shakeri, M. and Pattipati, K.R., "Optimal and Near-Optimal Algorithms for Multiple Fault Diagnosis with Unreliable Tests," IEEE Transactions on Systems, Man, and Cybernetics—Part C: Applications and Reviews, vol. 28, No. 3, Aug. 1998. pp. 431-440.

Tran, H.M. and Schonwaler, J., "Fault Resolution in Case-Based Reasoning," Pricai 2008: Trends in Artificial Intelligence, Springer Berlin Heidelberg, Dec. 15, 2008. pp. 417-429.

* cited by examiner

DIAGNOSING COMBINATIONS OF FAILURES IN A SYSTEM

The present invention relates to diagnosing combinations of failures in a system.

Diagnosis methods are known that are intended to support the construction and maintenance of complex systems. One example of a known diagnosis method, produced by BAE Systems PLC, which has applications in troubleshooting for maintenance. Elements of the diagnosis method are disclosed in the International Patent application "Assisting Failure Diagnosis in a System using Bayesian Network", published as WO2009/136183, the contents of which are hereby incorporated by reference. The diagnosis method uses a probabilistic Bayesian Network model. The model is used with Bayesian inference algorithm to compute the marginal probability of each failure given a set of observed symptoms. Bayesian inference class is an example of probabilistic Marginal inference class. Joint-tree inference is another alternative example.

One of the strengths of the existing diagnosis method was that it can cope with multiple simultaneous failures (combinations of failures). Using a marginal inference class (e.g. Bayesian inference), it produces a ranked list of "failures", and expected information gain on the symptoms. However, recognising that there might be multiple failures which explain the symptoms is conventionally still a matter of interpretation which was left to the user of the method, and this requires user skill.

Embodiments of the present invention are intended to address at least some of the problems discussed above.

The present inventors have devised a methodology that is capable of automatically analysing the input symptoms and distinguishing cases where it is more likely that the pattern of evidence indicates more than one failure, which includes an implementation of an L-best inference class algorithm (e.g. Ranked Algorithm (RA) (Mojdeh Shakeri, Krishna R. Pattipati, Optimal and Near-Optimal Algorithms for Multiple Fault Diagnosis with Unreliable Tests, IEEE TRANSACTIONS ON SYSTEMS, MAN, AND CYBERNETICS—PART C: APPLICATIONS AND REVIEWS, VOL. 28, NO. 3, AUGUST 1998, pp. 431-440)). The RA can produce a ranked list of "failure sets", which may be ordered in accordance to their probability. For example, a "failure set" can include multiple failures (e.g. "Leak from valve" and "Power supply failure") at the same instance. RA is an algorithm which uses a maximum a posteriori (MAP) algorithm as a subroutine. The Lagrangian Relaxation Algorithm (LRA) procedure is an example of a MAP algorithm which uses lagrangian relaxation and subgradient optimisation methods to form a ranked set of fault sets. LRA is discussed in (e.g. Fang Tu, Krishna R. Pattipati, Somnath Deb, and Venkata Narayana Malepati, Computationally Efficient Algorithms for Multiple Fault Diagnosis in Large Graph-based Systems, IEEE TRANSACTIONS ON SYSTEMS, MAN, AND CYBERNETICS—PART A SYSTEMS AND HUMANS, VOL. 33, NO. 1, JANUARY 2003, pp. 73-85) (e.g. Feili Yu, Fang Tu, Haiying Tu, and Krishna R. Pattipati, A Lagrangian Relaxation Algorithm for Finding the MAP Configuration in QMR-DT, IEEE TRANSACTIONS ON SYSTEMS, MAN, AND CYBERNETICS—PART A: SYSTEMS AND HUMANS, VOL. 37, NO. 5, SEPTEMBER 2007, pp. 746-757).

An alternative to RA can be an exhaustive search of failure sets (e.g. brute-force) up to a certain size of failure sets and it can be is computationally intensive.

In cases where there are multiple failures, L-best inference class (e.g. RA) can provide useful additional information. However, the L-best inference class (e.g. RA) is computationally intensive and therefore the present inventors have devised methods that can deliver the benefits whilst reducing computational costs.

In embodiments of the present invention a set of heuristic techniques can be added to the L-best inference class (e.g. RA) and combined with marginal inference class (e.g. Bayesian inference), which for example computes failure marginal probabilities, to provide the extended diagnosis method. This method can provide computationally efficient diagnosis results of "multiple failure sets", and can also provide practical feedback and advice when troubleshooting. Using the extended diagnosis method in troubleshooting, the overall diagnosis time of identifying "multiple failure sets" can be decreased, unnecessary component (e.g. LRI) replacements due to uncertainties can be decreased, and the dependency upon the maintainer capability can also be decreased.

In order to achieve computationally efficient diagnosis of multiple failure sets, the ranked list of probable failure outputs of the marginal inference class algorithm (e.g. Bayesian inference) can be used as an input to the L-best inference class algorithm (e.g. RA) and a set of heuristics have been designed. In some embodiments, the marginal (Bayesian) inference algorithm can provide a ranked list of probable failures considering the posterior marginal probabilities of the failures. A configurable number of top probable failures provided by the marginal (Bayesian) inference algorithm may be considered as the probable failures to investigate further by using the L-best inference (e.g. RA), and the rest of the failures provided by the marginal (Bayesian) inference may be considered as absent failures in the L-bets inference inputs. Other L-bets inference inputs can include the observed symptoms. Other embodiments can employ approximate algorithms. For these, an approach which ignores less informative present symptoms (which have many parent failures) in L-best inference has been built. These smaller approximate problems can be much quicker to solve. A further improvement can be provided by automatically halting the evaluation in L-best inference when sufficient ranked sets have been obtained. For example, if two sets were found with a fairly large confidence, and all further sets had very small confidence levels, then the system can stop producing failure sets. This can reduce computation time as computation time is proportional to the number of ranked sets.

According to a first aspect of the present invention there is provided a method of diagnosing combinations of failures in a system, the method including or comprising:

receiving symptom data including information relating to observed or detected symptoms in the system;

generating failure data including information relating to at least one most probable failure in the system based on the symptom data, and processing the failure data and the symptom data using an L-best inference technique in order to generate failure set data, the failure set data including information relating to at least one most probable combination of the failures that explain the symptoms.

The L-best inference technique may comprise a Ranked Algorithm (RA) technique. The step of processing using the L-best inference technique can produce a probability value associated with each said combination of failures in the failure set data. The method may further include ordering the combinations of failures in the failure set data in accordance with the associated probability values. The method may include displaying information relating to the combinations of failures and the associated probability values.

The step of processing using the L-best inference (e.g. RA) technique can produce a probability value associated with each said failure in each combination of failures data. The method may further include ordering the failures in the combination of failures data in accordance with the associated probability values. The method may include displaying information relating to the failures and the associated probability values.

The method may include selecting a technique for use in the step of generating the failure data. In some embodiments, a comparison based on a number of present symptoms in the symptom data a user-configurable value may be used to select the marginal inference technique (e.g. Bayesian inference technique) for use in the step of generating the failure data. In some embodiments, if the number of present symptoms is greater than the user-configurable value (e.g. 10) then an approximate marginal inference (e.g. variational inference) algorithm technique is selected; otherwise, an exact marginal inference (e.g. Quickscore algorithm) technique is selected.

The step of generating failure data may include processing the symptom data using a marginal inference (e.g. Bayesian inference) algorithm technique. The marginal inference (e.g. Bayesian inference) algorithm technique may generate a ranked list of probable failures. The marginal inference (e.g. Bayesian inference) algorithm technique may generate the ranked list of probable failures by considering posterior marginal probabilities of the failures.

A user-configurable number (M, e.g. 10) of the most probable failures generated by the step of generating the failure data may be provided as the failure data to be processed using the L-best inference (e.g. RA) technique. Others of the failures generated may be provided as absent failures data to be processed using the L-best inference (e.g. RA) technique.

The method may further include halting the processing the failure data and the symptom data using the L-best inference (e.g. RA) technique when a sufficient number of said combinations of the failures have been generated. In some embodiments, the sufficient number may comprise a user-configurable value (β, e.g. 5). Each said combination of failure may have an associated confidence (probability) value. If the smallest confidence value is not sufficiently low (i.e. if the multiplication of the smallest confidence value with a user-configurable factor (γ, e.g. 10) is not smaller than the previous confidence value) then the method may resume the processing of the failure data and the symptom data using the L-best inference (e.g. RA) technique to generate at least one further combination of the failures.

The symptom data processed using the L-best inference (e.g. RA) technique may include present symptoms that have at most user-configurable number (N, e.g. 10) of parent failures.

According to another aspect of the present invention there is provided a method of diagnosing combinations of failures in a system, the method including or comprising:

receiving symptom data including information relating to observed or detected symptoms in the system;

receiving failure data including information relating to at least one most probable failure in the system, and processing the failure data and the symptom data using an L-best inference technique in order to generate failure set data, the failure set data including information relating to at least one most probable combination of the failures that explain the symptoms.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

According to another aspect of the present invention there is provided apparatus including or comprising:

a device configured to receive symptom data including information relating to observed or detected symptoms in a system;

a device configured to generate failure data including information relating to at least one most probable failures in the system based on the symptom data, and a device configured to process the failure data and the symptom data using an L-best inference technique in order to generate failure set data, the failure set data including information relating to at least one most probable combination of the failures that explain the symptoms.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

The existing Diagnosis method includes a marginal inference (Bayesian Inference) module that takes "Symptoms" as its input and returns probable "Failures" as a ranked list at its output. In embodiments of the present system, the system architecture has been extended to include another inference technique, i.e. a heuristic L-best inference (e.g. RA) module, in order to provide the ranked combinations of the probable failures, i.e. the "failure sets", as well. Thus, with the addition of this capability, the diagnosis can now provide a ranked list of "failure sets" in addition to the ranked list of the "failures".

Figure 1:
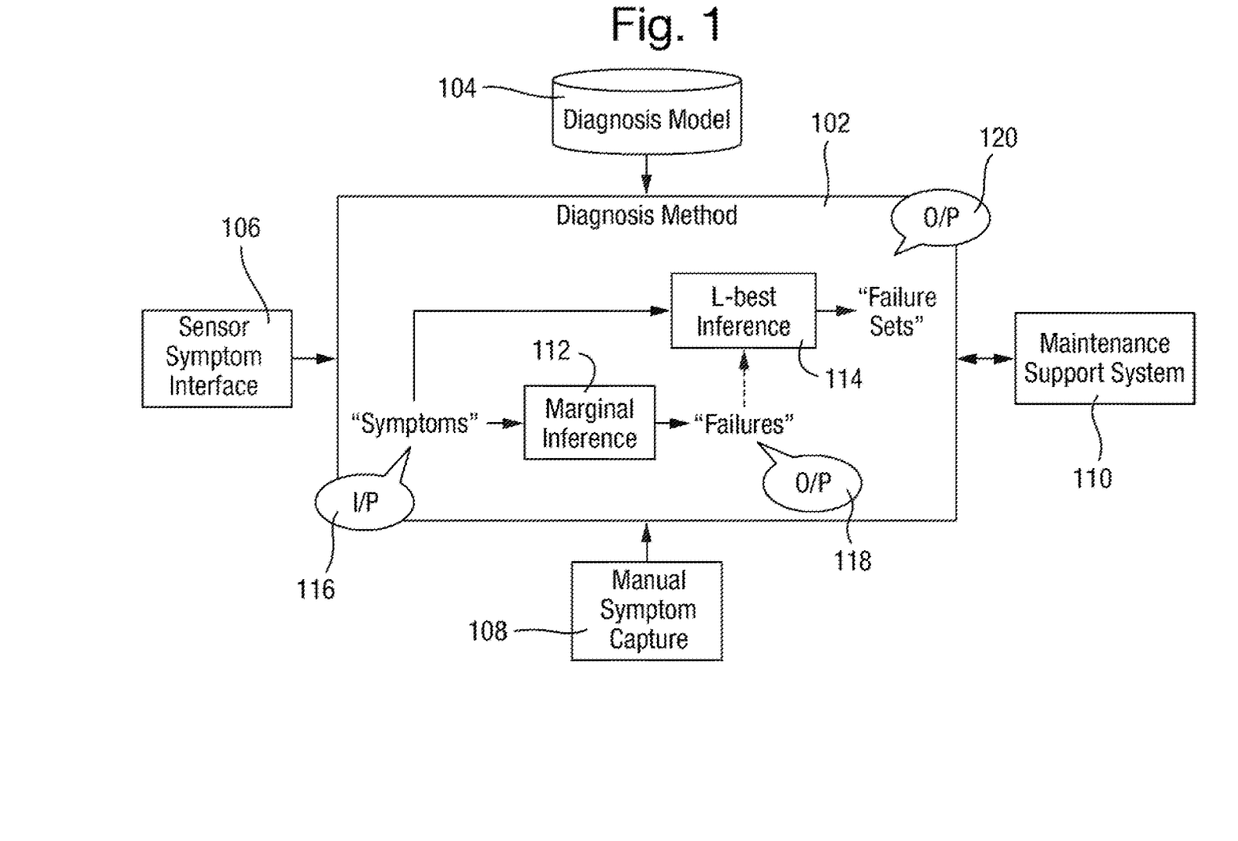
FIG. 1 is a high level system architecture diagram of an embodiment of the diagnosis method.

FIG. 1 shows the high level system architecture diagram for the extended diagnosis method 102, which will typically be implemented on at least one computer system having a processor, memory and communications interface. The diagnosis method receives data representing a diagnosis model from a data store 104. The model can be in any suitable format, typically data based on a probabilistic graphical model of the system, its components (and possibly its subsystems) and the relationship between them. The method can further receive input representing sensor symptom readings via an interface 106 and can also receive input representing manually-captured symptoms, based on data relating to observed symptoms provided by users of the system being diagnosed, via another interface 108. The diagnosis system can also communicate with a maintenance support system 110. It will be appreciated that the illustrated architecture of FIG. 1 is exemplary only and in other embodiments some of the components may be integrated into single elements; distributed over two or more elements; omitted and/or include at least one further component.

The method 102 includes a marginal inference (Bayesian interface) module 112, a heuristic L-best inference (e.g. RA) module 114. The marginal interface module can receive as input symptoms data 116 received via the interfaces 106, 108 and can output failures data 118. The heuristic L-best inference module can receive as its inputs the symptoms 116 and failures data 118 and can generate ranked probable failure sets data 120 at its output.

Embodiments of the extended diagnosis method 102 have been implemented in Python™, C++, and Matlab™, although the skilled person will understand that any suitable programming language and data structures can be used. Embodiments of the marginal inference module 112 can run on C++, the heuristic L-best inference module runs on Python, and the user interface can run on Matlab™.

Figure 2:
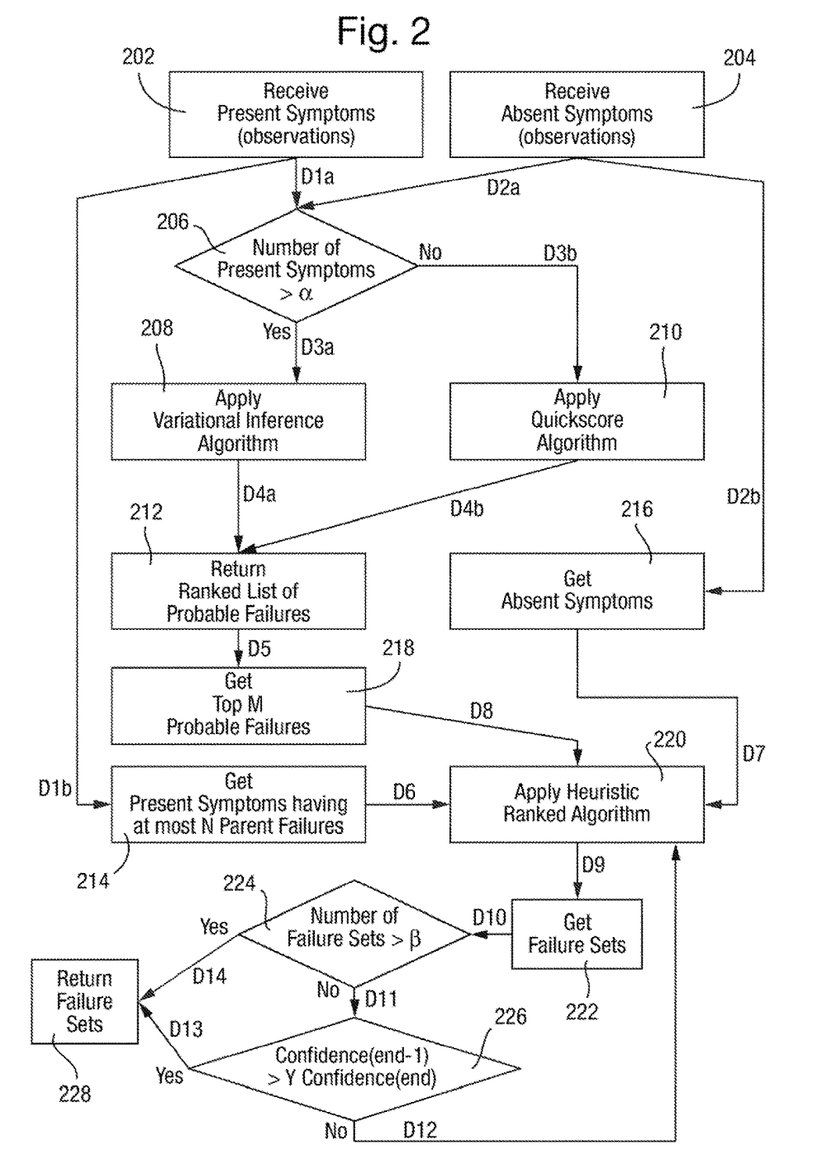
FIG. 2 is a flowchart illustrating example steps performed by the diagnosis method.

FIG. 2 illustrates schematically an example of the method performed by the diagnosis method 102. The skilled person will appreciate that the steps shown are exemplary only and that in alternative embodiments, some of them may be omitted and/or re-ordered.

The method can receive data representing present symptoms and absent symptoms (e.g. via interface 106 and/or 108). A symptom consists of at least one symptom observation and can include conditions. A portion of sample list of symptoms is presented below, along with their corresponding symptom codes:

. . .
S(32) Cond: Valve 2 commanded closed Obs: Valve Sensor 2.1 set true
S(33) Cond: Valve 2 commanded open Obs: Valve Sensor 2.1 set false
. . .
S(47) Obs: Valve 5 Fuel escaping true
S(48) Obs: Valve5 stuck in intermediate position
. . .

At step 206 a check is performed as to whether the number of present symptoms represented in the present symptom data and the absent symptoms data is greater than a value $\alpha$. The diagnosis method 102 can include parameters/values, such as $\alpha$, that are user-configurable, e.g. via a user-interface. In some cases they can be set to default values. In the example embodiment, $\alpha$ has been set as 10.

Data D1$a$ and data D1$b$ are sent simultaneously. At step 214 the present symptom data is analysed to obtain the present symptoms that have at most a user-configurable number (N, e.g. 10) of parent failures, i.e. causing failures where if one is present then the symptom is also likely to be present. N can be selected in order to achieve an acceptable balance between inference time and approximation error.

Data D2$a$ and data D2$b$ are sent simultaneously. At step 216, the absent symptom data is received, ready for subsequent processing as will be described below.

If the check performed at step 206 indicates that the number of present symptoms is greater than $\alpha$ then at step 208 a technique based on an approximate inference algorithm (e.g. variational inference), using module 112, is performed on the symptoms data. Alternatively, if the check performed at step 206 indicates that the number of present symptoms is not greater than $\alpha$ then at step 210 a technique based on an exact inference algorithm (e.g. the known Quickscore algorithm) is performed on the symptoms data. Execution of one of the selected algorithms can produce data representing a list of probable failures (data D4$a$ if step 208 was performed; or data D4$b$ if step 210 was performed), which may be ranked according to the marginal probability of each failure in the list at step 212.

At step 214, the present symptoms that have at most N parent failures are passed to an RA-based technique (220) for processing. At step 216, the received absent symptom data is passed to the RA-based technique (220) for processing. At step 218 the method obtains the top M probable failures in the list, and the top M probable failures data is passed to the RA-based technique for processing (220). M is a user-configurable value and in the specific example has a value of 10. At step 220 the RA-based technique is executed, e.g. using module 114.

At step 222 data based on the failure set generated at step 220 is obtained and at step 224 a check is performed as to whether the number of failure sets generated so far is greater than a value $\beta$. In the specific example $\beta$ is set as 5.

If the check of step 224 indicates that the number of failure sets generated is not greater than $\beta$, then at step 226 a check is performed as to whether the smallest confidence (probability) value (corresponding to the last probable failure set) is sufficiently low (i.e. a check is performed as to whether the multiplication of the smallest confidence value with a user-configurable factor ($\gamma$, e.g. 10) is smaller than the previous confidence value). Confidence of a failure set can be defined in terms of the normalised ratio of "the probability value for a failure set" to "the probability value for the most likely failure set" as given in (Feili Yu, Fang Tu, Haiying Tu, and Krishna R. Pattipati, A Lagrangian Relaxation Algorithm for Finding the MAP Configuration in QMR-DT, IEEE TRANSACTIONS ON SYSTEMS, MAN, AND CYBERNETICS—PART A: SYSTEMS AND HUMANS, VOL. 37, NO. 5, SEPTEMBER 2007, pp. 746-757).

If the check of step 226 indicates that the smallest confidence (probability) value is not sufficiently low then control returns to step 220, where the RA technique is performed again to generate a further failure set.

If the check of step 226 indicates that the smallest confidence (probability) value is sufficiently low then at step 228 data relating to the generated failure sets is produced and stored for further use.

If the check of step 224 indicates that the number of failure sets generated is greater than $\beta$ then at step 228 data relating to the generated failure sets is produced and stored for further use.

Further use of the failure sets data will typically involve being displayed on a computer terminal (either immediately or upon user request). Examples of how the data can be displayed will be discussed below, but it will be understood that the way in which the data can be displayed, formatted and used can vary.

In a demonstration scenario, five symptoms were applied as present (+) to the diagnosis method 102, based on a hierarchical realistic large scale model of fuel rig. Other symptoms in the example were unobserved, thus unknown. In this example, the observed symptoms as present were (S32, S33, S47, S48 and S103).

+S(32) Cond: Valve 2 commanded closed Obs: Valve Sensor 2.1 set true

+S(33) Cond: Valve 2 commanded open Obs: Valve Sensor 2.1 set false

+S(47) Obs: Valve 5 Fuel escaping true

+S(48) Obs: Valve5 stuck in intermediate position

+S(103) Obs: Tray 2 sometimes makes an unusual noise true

S32 and 833 are from a subset of the symptoms for the failures (F296 or F297). S47 and 848 are from a subset of the symptoms for the failure (F74). S103 is a less informative symptom (i.e. symptom with many failure parents).

F(74) Valve 5—Leak from

F(296) Power Supply 1—24 volt power supply failure

F(297) Power Supply 1—Phase A has failed

Figure 3:
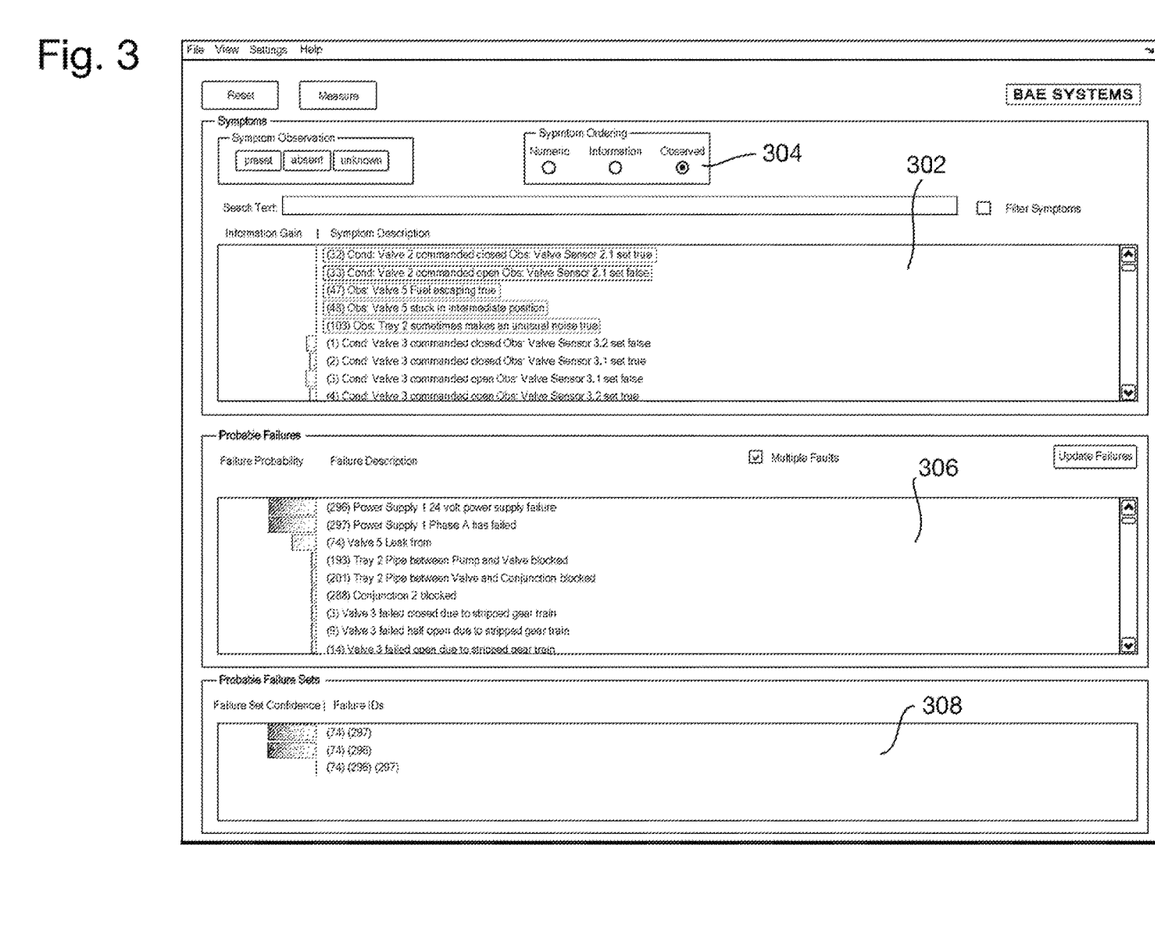
FIGS. 3 and 4 are example screen displays produced by the diagnosis method.

FIG. 3 presents an example of the diagnosis user interface. Here, the symptoms are displayed in the first panel 302 at the top. The symptoms are ordered considering the 'Symptom Ordering' radio box 304. In the illustrated case, the symptom ordering criteria is selected as 'Observed'. The ranked list of probable "failures" obtained by using the Bayesian inference algorithm is displayed at the second panel 306; and the ranked list of probable "multiple failure sets" obtained by using the heuristic RA considering the symptoms and the Bayesian inference algorithm outputs at its inputs are displayed in the third panel 308.

The conventional (Bayesian) diagnosis interface and the new heuristic RA interface can be compared. The second panel 306 is the conventional (Bayesian) diagnosis interface. It indicates that, given the evidence, failures 296 & 297 may be present, with fault 74 less likely.

In this example, the conventional (Bayesian) diagnosis calculates the probable failures and sorts them considering their marginal probabilities. The top M (e.g. 10) probable failures and their marginal probabilities (P) can be as follows:

F(296) Power Supply 1—24 volt power supply failure: P=0.4945

F(297) Power Supply 1—Phase A has failed: P=0.4945

F(74) Valve 5—Leak from: P=0.2480

F(193) Tray 2—Pipe between Pump and Valve blocked: P=0.0527

F(201) Tray 2—Pipe between Valve and Conjunction blocked: P=0.0527

F(288) Conjunction 2—blocked: P=0.0527

F(3) Valve 3—failed closed due to stripped gear train: P=0.0527

F(9) Valve 3—failed half open due to stripped gear train: P=0.0527

F(14) Valve 3—failed open due to stripped gear train: P=0.0527

F(212) Valve 9—Failed and is now always open: P=0.0527

In this example, the new heuristic RA can take the above top M (e.g. 10) failures as probable failures at its input. It can also take the symptoms 32, 33, 47 and 48 as present symptoms at its input. Since symptom 103 is a less informative symptom, it is not considered in the example.

The third panel 308 for the new heuristic RA interface provides additional information; indicating that given the evidence, failure 74 together with either 296 or 297 is the most likely. The heuristic RA interface indicates the possible failure combinations but the conventional (Bayesian) diagnosis interface does not. Thus, in this case, the heuristic RA results can be more informative than the conventional (Bayesian) inference results.

In this example, the new heuristic RA calculates the probable failure sets and sorts them considering their confidence (probabilities). The top three probable failure sets and their confidence values (C), and the failure probability values (P) can be as follows:

Failure set 1: C=0.4972

F74 Valve 5—Leak from: P=1.0000

F297 Power Supply 1—Phase A has failed: P=05028

Failure set 2: C=0.4972

F74 Valve 5—Leak from: P=1.0000

F296 Power Supply 1—24 volt power supply failure: P=05028

Failure set 3: C=0.0055

F74 Valve 5—Leak from: P=1.0000

F298 Power Supply 1—24 volt power supply failure: P=05028

F297 Power Supply 1—Phase A has failed: P=05028

Figure 4:
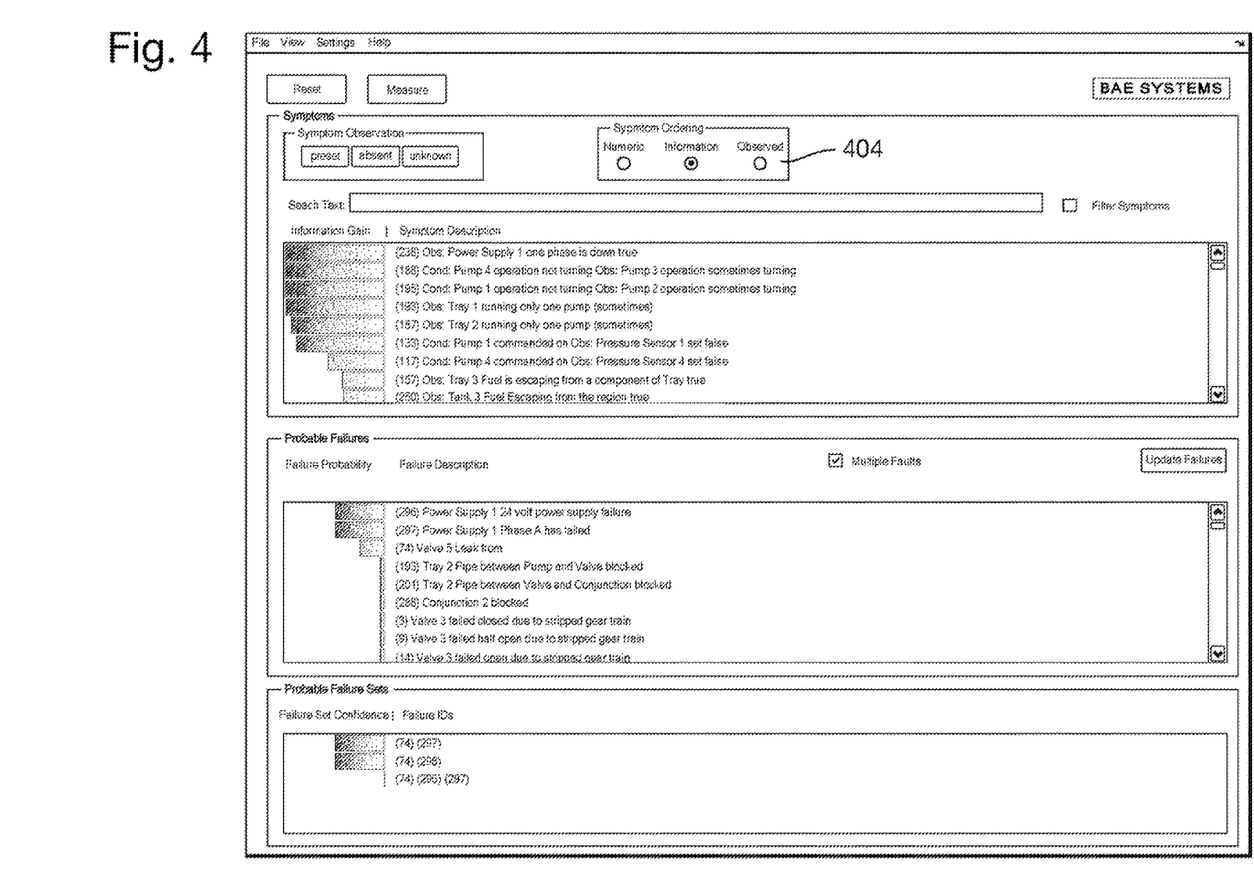

In the new diagnosis user interface, the remaining symptoms can still be sorted according to the information gains calculated during performing the Bayesian inference. For this purpose, in the illustrative example of FIG. 4, the symptom ordering criteria is selected as 'Information' by choosing the relevant radio box 404. The maintainer can consider these symptoms and decide to perform additional tests, if required.

In order to provide probable ranked failure sets, embodiments of the present invention use an improved heuristic RA in which a configurable number of top probable failures provided by the Bayesian inference algorithm can be considered as the probable failures to investigate further by using the heuristic RA. Other inputs can include the observed symptoms. An approach, which ignores less informative present symptoms (which have many parent failures) in RA has been built. A further improvement has been made by automatically halting the evaluation in RA when sufficient probable ranked sets have been obtained. These are the heuristic techniques added to the RA.

A number of experiments were performed to compare the diagnosis inference results and the computation times of the initial RA, Bayesian inference, and the heuristic (improved) RA. In the experiments, the initial RA has been speeded up approximately 2 orders of magnitude by adding heuristics and by considering the Bayesian inference outputs at RA inputs. The computation times of the Bayesian inference and the heuristic RA can now be of similar magnitudes to the conventional (Bayesian) diagnosis algorithm making it a practical add-on to the online diagnosis method. If the Bayesian inference was used alone then failure combinations might also be achieved by the maintainer after performing consecutive additional Bayesian inference test runs. In such a case, the maintainer would consider the information gains of the remaining symptoms at the consecutive runs and update the tests considering these consecutive results in order to investigate the probable failure sets. Troubleshooting in such complicated cases can be time consuming and be relied upon the maintainer capability. This can potentially lead to unnecessary component replacements. On the other hand, by using embodiments of the new extended diagnosis method, the drawbacks of sole usage of the initial approach can be avoided. Considering the experiments and the trial runs performed, it is concluded that the heuristic RA results cab be more informative than the Bayesian inference results because they can indicate possible failure combinations.

The invention claimed is:

1. A method of diagnosing combinations of failures in a system, the method including:
   receiving symptom data including information relating to observed or detected symptoms in a system;
   generating failure data including information relating to at least two most probable failures in the system based on the symptom data;
   processing the failure data and the symptom data using an L-rank inference class algorithm in order to generate failure set data, the failure set data including information relating to combinations of the at least two most probable failures that explain the symptoms; and
   selecting an algorithm for use in generating the failure data, wherein a comparison based on a number of present symptoms in the symptom data and a user-configurable value is used to select the algorithm for use in generating the failure data, and if the number of present symptoms is greater than a user-configurable value then an approximate marginal inference algorithm is selected; otherwise, an exact marginal inference algorithm is selected.

2. The method according to claim 1, wherein processing the failure and symptom data using the L-rank inference class algorithm includes using a Ranked Algorithm (RA) algorithm to produce a probability value associated with each said combination of the at least two most probable failures in the failure set data.

3. The method according to claim 2, further including ordering the combinations of the at least two most probable failures in the failure set data in accordance with the associated probability values.

4. The method according to claim 3, further including displaying information relating to at least one of the combinations of the at least two most probable failures and the associated probability values.

5. The method according to claim 1, wherein generating the failure data includes processing the symptom data using the approximate marginal inference algorithm, and wherein the marginal inference algorithm generates a ranked list of probable failures.

6. The method according to claim 1, wherein the at least two most probable failures not including a user-configured number of the at least two most probable failures are provided as absent failures data to be processed using the L-rank inference class algorithm.

7. The method according to claim 6, wherein each said combination of the at least two most probable failures in a said failure set has an associated confidence/probability value and the confidence/probability value is used to determine whether or not the processing using the L-rank inference class algorithm is to be used to generate at least one further failure set.

8. The method according to claim 1, further including halting the processing of the failure data and the symptom data using the L-rank inference class algorithm when a user-configurable number of said combinations of the at least two most probable failures has been generated.

9. The method according to claim 1, wherein the symptom data processed using the L-best inference class algorithm includes present symptoms that have at most a user-configurable number of parent failures.

10. The method according to claim 1, wherein a user-configurable number of the at least two most probable failures in the system, generated by generating the failure data, is included in the failure data to be processed using the L-rank inference class algorithm.

11. An apparatus adapted to diagnose combinations of failures in a system, the apparatus including:
    a processor configured to receive symptom data including information relating to observed or detected symptoms in a system;
    a processor configured to generate failure data including information relating to at least two most probable failures in the system based on the symptom data;
    a processor configured to process the failure data and the symptom data using an L-rank inference class algorithm in order to generate failure set data, the failure set data including information relating to at least one most probable combination of the at least two most probable failures that explain the symptoms; and
    a processor configured to select an algorithm for use in generating the failure data, wherein a comparison based on a number of present symptoms in the symptom data and a user-configurable value is used to select the algorithm for use in generating the failure data, and if the number of present symptoms is greater than a user-configurable value then an approximate marginal inference algorithm is selected; otherwise, an exact marginal inference is selected, and
    wherein the processors may be the same processor or may include multiple processors.

12. A non-transitory computer program product encoded with instructions that when executed by one or more processors cause a process of diagnosing combinations of failures in a system to be carried out, the process including:
    receiving symptom data including information relating to observed or detected symptoms in a system;
    generating failure data including information relating to at least two most probable failures in the system based on the symptom data; and
    processing the failure data and the symptom data using an L-rank inference class algorithm in order to generate failure set data, the failure set data including information relating to at least one most probable combination of the at least two most probable failures that explain the symptoms;
    selecting an algorithm for use in generating the failure data, wherein a comparison based on a number of present symptoms in the symptom data and a user-configurable value is used to select the algorithm for use in generating the failure data, and if the number of present symptoms is greater than a user-configurable value then an approximate marginal inference algorithm is selected; otherwise, an exact marginal inference is selected.

13. The non-transitory computer program product according to claim 12, wherein processing the failure and symptom data using the L-rank inference class algorithm includes using a Ranked Algorithm (RA) algorithm to produce a probability value associated with each said combination of the at least two most probable failures in the failure set data.

14. The non-transitory computer program product according to claim 13, further including at least one of:
    ordering the combinations of the at least two most probable failures in the failure set data in accordance with the associated probability values; and
    displaying information relating to at least one of the combinations of the at least two most probable failures and the associated probability values.

15. The non-transitory computer program product according to claim 12,
    wherein generating the failure data includes processing the symptom data using the approximate marginal inference algorithm, and wherein the marginal inference algorithm generates a ranked list of probable failures.

16. The non-transitory computer program product according to claim 12, wherein the failures not including the user-configured number of the most probable failures are provided as absent failures data to be processed using the L-rank inference class algorithm.

17. The non-transitory computer program product according to claim 12, the process further including halting the processing of the failure data and the symptom data using the L-rank inference class algorithm when a user-configurable number of said combinations of the failures, has been generated.

18. The non-transitory computer program product according to claim 17, wherein each said combination of the at least two most probable failures in a said failure set has an associated confidence/probability value and the confidence/probability value is used to determine whether or not the processing using the L-rank inference class algorithm is to be used to generate at least one further failure set.

* * * * *